Jan. 18, 1966     G. HEINZE ETAL     3,230,042
PROCESS FOR THE CONTINUOUS PRODUCTION OF CHROMIUM TRIOXIDE
Filed April 24, 1962
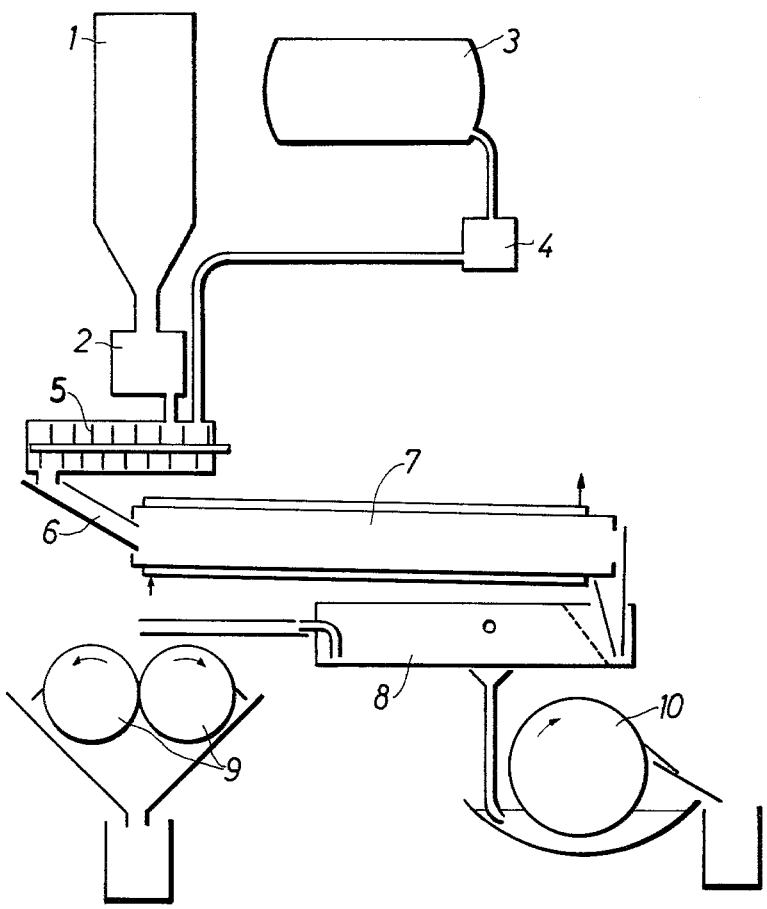
INVENTORS:
GERHARD HEINZE, HERBERT KNOPF, KLAUS SCHUBERT.
BY
ATTORNEYS 3,230,042
PROCESS FOR THE CONTINUOUS PRODUCTION
OF CHROMIUM TRIOXIDE
Gerhard Heinze, Herbert Knopf, and Klaus Schubert,
Leverkusen, Germany, assignors to Farbenfabriken
Bayer Aktiengesellschaft, Leverkusen, Germany, a corporation of Germany
Filed Apr. 24, 1962, Ser. No. 189,923
Claims priority, application Germany, Apr. 29, 1961,
F 33,817
3 Claims. (Cl. 23—145)

The present invention relates to an improved and efficient process for the continuous production of chromium trioxide.

The prior art process of producing chromium trioxide uses in general as starting material an alkali metal dichromate, e.g. sodium dichromate, which is reacted with sulfuric acid to form chromium trioxide, sodium hydrogen sulfate and water in accordance with the equation:

$$Na_2Cr_2O_7 + 2H_2SO_4 \rightarrow 2CrO_3 + 2NaHSO_4 + H_2O$$

In the so-called "wet-process" of producing chromium trioxide the reaction is carried out in aqueous solution and—mostly in the presence of a relatively large excess of sulfuric acid—there is obtained a contaminated crude chromic acid which is filtered off; and worked up in further processing steps to yield pure chromium trioxide. In the so-called "dry process" of producing chromium trioxide, sodium dichromate is mixed with concentrated sulfuric acid in a reactor provided with a vigorous stirrer and then gradually heated up by heating from outside. The evaporation of water which initially occurs is accompanied by an increase in viscosity. The sodium hydrogen sulfate melts at a temperature of about 170° C. and, finally, the chromium trioxide melts at 198° C. After stopping the stirrer the chromium trioxide melt which is of higher specific gravity settles down and is withdrawn through a discharge means provided at the bottom of the reactor.

The disadvantages of the prior art process are on the one hand the necessity for a large expenditure for service which is harmful to the health of the attendants, and on the other hand, the unsatisfactory yield which seldom reaches 90% of the theoretical. The latter disadvantage is a result of losses occurring during the heating period by decomposition of the resulting chromium trioxide. Another disadvantage in the prior art process is the formation of crusts on the heating surfaces, which occurs despite thorough mixing and slow heating. For this reason the reactor needs periodic cleaning.

Because of the instability of molten chromium trioxide, $CrO_3$ can be kept at temperatures slightly above its melting point for at most 20 to 30 minutes if a product of high purity is to be obtained. Decomposition of $CrO_3$ is however promoted by the presence of sulfuric acid or sodium hydrogen sulfate to such an extent that under the conditions of the prior art process an essential amount of chromium trioxide decomposes below its melting point to give gaseous oxygen and water-insoluble chromium compounds of lower valency. It is not possible to shorten the reaction time with a view to reducing the decomposition losses by heating up more rapidly, since this would cause more than before considerable crust formation exceeding the unavoidable rate.

Heretofore the continuous process of producing chromium trioxide has been seriously handicapped by the aforesaid drawbacks and all attempts to continuously produce $CrO_3$ on a large scale have failed so far. An apparatus has been described in the literature for the continuous production of chromium trioxide wherein the reactor is divided by an annular, concentrically arranged partition wall which does not extend down to the bottom, into a mixing and heating zone which is equipped with stirrer means and an ambient steadying chamber which is adapted to separate the layers of the molten end products which are withdrawn through a bottom discharge means and an overflow pipe. The density fluctuations of the sodium hydrogen sulfate melt and the foaming reaction mass which is permeated by water vapor bubbles, render it extremely difficult to obtain with the aforedescribed apparatus a constant flow of material. Even slight variations of the ratio adjusted between the dichromate and the sulfuric acid entail fluctuations in the reaction course, leading to overheating, crust formation and incomplete separation of the molten phases. Besides, the construction of apparatus of large dimensions for the production of $CrO_3$ on the technical scale involves the difficulty of accommodating a sufficiently large heat-transfer surface for rapidly, but nevertheless carefully, heating up the reactants. According to the unsatisfactory experiences previously observed, the chances of accomplishing separation of the two melts in a flowing system with the requisite accuracy appeared decidedly poor. Even in the batchwise production of chromium trioxide, which allows for separating the melts when fully kilned, only part of the chromium trioxide can be recovered as a fraction of high purity. The principal object of the present invention is to do away with the disadvantages associated with the prior art process of producing chromium trioxide and to provide an improved and efficient process for the continuous production of $CrO_3$ of high purity and in good yields.

Further objects will become apparent as the following description proceeds.

In accordance with the invention it has been found that chromium trioxide is obtained in a continuous process in good yields from alkali dichromate and sulfuric acid by continuously feeding the two reactants to a mixing apparatus, preferably a mixing screw, wherein the components are reacted, passing the reaction mixture to a horizontally arranged, externally heated cylinder rotating about its longitudinal axis, heating up the input side of the cylinder to a temperature effecting evaporation of the water formed in the reaction, and heating up the output side of the cylinder to a temperature melting the chromium trioxide formed in the reaction, continuously feeding the mixture of molten chromium trioxide and molten alkali hydrogen sulfate to a separating cell designed as an elongated trough, withdrawing the molten chromium trioxide which settles on the bottom of the separating cell because of its higher specific gravity, through an uptake extending substantially down to the bottom of the separating cell, and withdrawing the molten alkali hydrogen sulfate via an overflow means provided at the top of the separating cell.

The disadvantages of the prior art process are overcome according to the invention which allows the production of chromium trioxide in a continuous process. A critical advantage of the herein described process is an increased yield of chromium trioxide, of a high degree of purity as compared with the prior art process. Besides, the attendance required in the production of chromium trioxide according to the invention is reduced to a minimum, and the invention allows a high rate of production of $CrO_3$ per unit time and unit volume of reaction space. One of the essential features of the process according to the invention is the very short residence time of the reaction mixture in the heating zone, say only a few minutes. It has surprisingly been found that the method of heating according to the invention leads to the formation of a hydrogen sulfate melt of low viscosity which readily separates from the chromium trioxide formed. This allows for utilizing the advantages of the continuously working separating cell, which is likewise an essential feature of the invention. The stream of molten chromium trioxide leaving the separating cell at a rate which is constant per unit time as is required for converting into flakes without any losses and which is accomplished in accordance with the invention by means of a double roller.

The invention will now be described with reference to the accompanying drawing showing diagrammatically one embodiment of an apparatus suitable for carrying out the process of the invention.

The starting components, sodium dichromate and sulfuric acid, are supplied from storage tanks 1 and 3 and fed at a uniform rate via the proportioning devices 2 and 4 to a double-paddle type mixing screw 5. By the heat evolved in the reaction using $Na_2Cr_2O_7 \cdot 2H_2O$ and sulfuric acid (96%) the temperature in the mixing screw rises to about 80° C. At this temperature the reaction mass is of pasty consistency. The mixer does not need a supply of additional heat.

The reaction mass is conveyed by the shaking channel 6 to the rotating cylinder 7 which is positioned at a slightly inclined level. The cylinder 7 is heated from outside, e.g. by gas flames or combustion gases. At the input side of the cylinder there occurs substantially evaporation of water as well as melting of a minor portion of sodium hydrogen sulfate. The remaining amount of sodium hydrogen sulfate and finally the chromium trioxide are melted near the output side of the cylinder. A certain amount of the melt is stowed in the cylinder by the overflow edge arranged at the output side to promote heat transfer.

It was not to be expected that the reaction mixture which passes various plasticity stages during heating and, as experience teaches, shows a strong tendency of sticking, forming crusts and undergoing decomposition, can be heated and transported at a uniform rate in a rotating cylinder having no mechanical vibratory arrangement, until it is completely molten. It is therefore a surprising feature of the invention that the deleterious rimming action occurring in the rotary cylindrical kilns usually employed in the chemical and cement industry, are not to be found in the herein described process. This advantage can perhaps be ascribed to the short residence time of the reaction mixture in the heating zone. Another advantage of the invention is that the temperature can be adjusted over the length of furnace in proper relation to the respective condition of the reaction mixture being conveyed through the furnace in longitudinal direction.

The molten substances, chromium trioxide and sodium hydrogen sulfate, leaving the cylinder pass at a continuous stream through the separating cell 8 which is designed as an elongated, trough. In the separating cell the chromium trioxide melt which is of higher specific gravity than the sodium hydrogen sulfate melt, settles to the bottom. The separating cell needs no heat supply, care has to be taken only that the temperature does not drop below the melting point of chromium trioxide. The chromium trioxide melt flows off from the separating cell through a standpipe extending substantially down to the bottom, while the sodium hydrogen sulfate melt flows off via an overflow pipe provided at the level of the melt. It is preferable to construct the separating cell so that the difference in height between the aforesaid two discharge means for the chromium trioxide and the sodium hydrogen sulfate melts can be varied by effecting slight inclination of the trough in order to compensate for any fluctuation in density of the sodium hydrogen sulfate melt and to thus maintain the surface of the molten chromium trioxide at the desired level. Any variation of the height of the discharge members by conventional means, e.g. adjustable weirs, slides or similar arrangements, have not proved to be useful, since members of this kind become immovable by crust formation or striking. The level of the melts is preferably controlled by scanning with electrodes and measuring the electrical conductivity, since molten chromium trioxide is non-conductive whereas hydrogen sulfate has a good conductivity. The residence time of the molten chromium trioxide in the separating cell is about 10 to 15 minutes at an average. Since the molten chromium trioxide is not mixed in the separating cell with the acidic reacting sodium hydrogen sulfate melt, decomposition of chromium trioxide appreciably impairing the quality and yield of the product does not occur during the relatively long residence time.

For cooling and solidification, the molten chromium trioxide is conveyed from the separating cell to iron pans, broken and ground. It is preferable however to solidify the chromium trioxide to form flakes by means of a double roller 9 consisting of two rotating cylinders which are cooled during rotation and from which the solidified product is scraped off by means of strippers. When using a single roller crusher immersed in a trough filled with the molten product, the residence time of chromium trioxide in the molten stage is too long so that the quality of the product is impaired. The sodium hydrogen sulfate can likewise be solidified by means of a flake producing roller 10.

Since a prolonged residence time is not harmful to sodium hydrogen sulfate, treatment thereof can be accomplished with a single cooling roller which scoops from the sump. To prevent the hydrogen sulfate melt from sticking to the roller it has proved advantageous to previously dilute the melt by adding water in an amount of about 10% of the weight of the melt.

Owing to the passivating action of the hexavalent chromium compounds, apparatus constructed of mild steel are suitable for carrying out the process of the invention. It is however advisable to use stainless steel for those members of the apparatus, e.g. the mixing screw and the heating pipe, which might come in contact with dilute sulfuric acid solutions which may be formed by condensation of water vapors.

The invention is further illustrated by the following examples without being restricted thereto.

Example 1

440 kg. of dry sodium dichromate containing 67.1% $CrO_3$ and 350 kg. of sulfuric acid (96%) are continuously fed per hour to an apparatus shown in the accompanying drawing. The ratio of the reactants is preferably 2.3 mols of sulfuric acid per mol of dichromate. The rotating heating tube is 4 m. in length and has an inside diameter of 400 mm.; the height of the overflow edge is 60 mm. At an inclination of 2% the tube rotates at about 20 revolutions per minute. A short time after starting up the apparatus 275 kg./h. of pure flaked chromium trioxide drop off from the roller; this corresponds to 93% of the chromium used. The resulting chromium trioxide contains 99.7% to 99.8% of $CrO_3$.

Example 2

(a) 80 g. of wet sodium dichromate (65.7% $CrO_3$) and 55 g. of sulfuric acid (94%) are fed per minute to a laboratory apparatus similar to that shown in the accompanying drawing, having a heating cylinder of 1,100 mm. length and inside diameter of 80 mm. only, an inclined position of 5% and a rotational speed of 6 revolutions per minute. The ratio of the reactants is 2.0 mols of sulfuric acid per mol of dichromate.

The yield of pure chromium trioxide (99% $CrO_3$) leaving the separating cell is 92.6% of the chromium used.

(b) 80 g. of wet sodium dichromate (65.7% $CrO_3$) and 66 g. of sulfuric acid (94%) are fed per minute to the apparatus described in Example 2a. The ratio of the reactants is 2.40 mols of sulfuric acid per mol of dichromate.

The yield of pure chromium trioxide (99.6% of $CrO_3$) leaving the separating cell is 93.5%.

Evaluation of the experiments described in Examples 2a and 2b shows that it is of advantage to carry out the herein described process with an excess of sulfuric acid. In this case the hydrogen sulfate phase contains a lesser amount of chromium(VI)-compounds and the yield is increased.

| | Molecular ratio, dichromate: $H_2SO_4$ | Chromium content of sodium hydrogen sulfate | |
|---|---|---|---|
| | | Percent Cr—VI | Percent Cr—III |
| Example 2a | 1:2.0 | 0.85 | 1.91 |
| Example 2b | 1:2.4 | 0.57 | 1.87 |

We claim:

1. A process for the continuous production of chromium trioxide by treating alkali metal dichromate with sulfuric acid comprising reacting solid alkali metal dichromate with sulfuric acid while continuously mixing said alkali metal dichromate and sulfuric acid, feeding the resulting reaction mass with shaking into a horizontally arranged cylinder rotating about its longitudinal axis, heating said cylinder externally on its input side to a temperature effective for evaporating off the reaction water, heating the output side of said cylinder to a temperature effective for melting the chromium trioxide, continuously conveying the mixture of molten chromium trioxide and the molten alkali metal hydrogen sulfate thereby formed into an elongated, separating trough, discharging said molten chromium trioxide from the bottom-most portion of said separating trough, discharging said molten alkali hydrogen sulfate by an overflow provided at the uppermost portion of said separating trough solidifying said molten chromium trioxide by passing the same onto a double roll, maintaining the temperature of said roll at a temperature below 198° C. and recovering the chromium trioxide in the form of flakes from said roll.

2. A process according to claim 1 wherein the molten alkali hydrogen sulfate is solidified by adding thereto 10% by weight of said molten alkali hydrogen sulfate of water and passing the resulting mixture onto a roll, maintaining the temperature of said roll at a temperature below 170° C. and immersed partially in the molten alkali hydrogen sulfate and recovering the alkali hydrogen sulfate in the form of flakes by scraping the same off of said roll.

3. A process as claimed in claim 1 which comprises varying the difference in height between the discharge level of the molten chromium trioxide and the discharge level of the alkali hydrogen sulfate by effecting an inclination of said separating trough.

References Cited by the Examiner
UNITED STATES PATENTS

| 1,873,889 | 8/1932 | Hines | 23—145 |
| 2,979,421 | 4/1961 | Rissman et al. | 23—313 X |

MAURICE A. BRINDISI, *Primary Examiner.*